United States Patent [19]

Loew et al.

[11] 4,175,448

[45] Nov. 27, 1979

[54] ELECTROMECHANICAL SWITCHING SYSTEM

[75] Inventors: Peter Loew, Wallau; Wolfgang Hummel, Wiesbaden, both of Fed. Rep. of Germany

[73] Assignee: Hoechst Aktiengesellschaft, Frankfurt am Main, Fed. Rep. of Germany

[21] Appl. No.: 844,468

[22] Filed: Oct. 21, 1977

[30] Foreign Application Priority Data

Oct. 22, 1976 [DE] Fed. Rep. of Germany ....... 2647787

[51] Int. Cl.[2] .......................... F16H 3/08; F16H 5/06; B60K 20/10; B60L 5/10

[52] U.S. Cl. ........................................ 74/365; 74/335; 74/337.5; 192/84 P

[58] Field of Search ...................... 74/365, 335, 337.5; 192/84 P

[56] References Cited

U.S. PATENT DOCUMENTS

| | | | |
|---|---|---|---|
| 2,842,003 | 7/1958 | Fussangel | 74/365 |
| 3,163,087 | 12/1964 | Crowe et al. | 74/365 X |
| 3,176,530 | 4/1965 | Stobbe et al. | 74/365 |
| 3,202,323 | 8/1965 | Powell | 74/365 X |
| 3,220,274 | 11/1965 | Osburn et al. | 74/365 |
| 3,244,019 | 4/1966 | Weber | 74/365 |
| 3,451,284 | 6/1969 | Sackler et al. | 74/365 X |
| 3,478,851 | 11/1969 | Smyth et al. | 74/365 X |
| 3,744,347 | 7/1973 | Kubo et al. | 74/365 X |
| 3,805,640 | 4/1974 | Schnelder et al. | 74/365 X |
| 3,983,405 | 9/1976 | Donovan | 74/365 X |
| 4,073,198 | 2/1978 | Ford | 74/365 X |

FOREIGN PATENT DOCUMENTS

| | | |
|---|---|---|
| 875309 | 8/1961 | United Kingdom . |
| 1404395 | 8/1975 | United Kingdom . |

*Primary Examiner*—Samuel Scott
*Assistant Examiner*—Randall L. Green
*Attorney, Agent, or Firm*—Schwartz, Jeffery, Schwaab, Mack, Blumenthal & Koch

[57] ABSTRACT

An electromechanical switching system which includes a multi-stage gearbox which has a plurality of manually selectable gear ratios corresponding to a plurality of positions of components which are movable between these positions, apparatus for automatically locating the components in the position corresponding to the selected gear ratio, and a device for locking the gearbox in a selected gear ratio while the operation is running. The position of the components is monitored and an indication provided the operator to prevent the start before the components are correctly positioned.

8 Claims, 6 Drawing Figures

ELECTROMECHANICAL SWITCHING SYSTEM

BACKGROUND OF THE INVENTION

1. Field of the Invention

The invention relates to an electromechanical switching system with a multi-stage gearbox which may be used, for example, for changing the rotational speed of a drum by selecting of a reduction factor, and with geared step motors for the positioning of components, for example, optical reproduction elements, corresponding to the selected reduction factor for the drum rotational speed.

2. The Prior Art

With electrophotographic copying machines and drawing-duplicating machines the problem is encountered of producing reduced-size copies from an original copy. This is effected in general in that a speed difference is produced between the transport speed of the original copy and the rotational speed of a photoconductor drum, on whcih a latent electrostatic charge image of the original copy is created, by reducing the transport speed of the original copy, which for example runs via an original-copy drum through an exposure and projection position, by predetermined reduction factors in a particular ratio. In a known device this is effected by choosing the reduction factor by means of electromechanical scanning elements which act on further electric final control elements. This presupposes, however, an expensive electromechanically switchable gearbox for changing of the transport speed of the original copy.

SUMMARY OF THE INVENTION

The object on which the invention is based is to provide a switching system which permits a simultaneous adjustment of the speed at which a piece of equipment, for example, an original-copy drum coupled to the gearbox is moved by a manual switching of the multi-stage gearbox, mentioned at the outset, and of the position of at least one component, for example optical elements of a copying or duplicating machine, like objective and mirror, and which prevents faulty operation of the copy machine or drawing duplicating machine during operation by intentional or unintentional alteration while the machine is operating, of the position of the component for a given speed of the piece of equipment, for example by the alteration of the selected reduction factors for the rotational speed of the original-copy drum.

The advantage achieved by the invention is that with constructionally simple means, such as a manually switchable multi-stage gearbox, a switching system is constructed which also permits a component, for example optical imaging elements to be adjusted on switching the multi-stage gearbox, and by which a mechanical blocking of the switching gear is effected in a simple manner with the aid of an electromagnet with a locking pin which cooperates with a locking ring provided with engagement notches. The invention permits the same functions to be carried out with a conventional manually-operated gearbox as with a constructionally substantially more complex, and more expensive gear, which has still to be developed.

The invention comprises an electromechanical switching system with a multi-stage gearbox for changing the rotational speed of a drum connected to driving means and said gearbox which has a plurality of manually selectable gear ratios, a lever coupled to said gearbox, which lever is movable into a plurality of different positions for selecting said gear ratios and is coupled to said electromechanical switching system, means for indicating the gear ratio selected, means responsive to said gear ratio indicating means for automatically locating at least one component connected to said switching system in the position corresponding to the selected gear ratio, and means for locking said gearbox in the selected one of said gear ratios.

Additional advantageous features are contemplated, including means for monitoring the position of the optical reproduction means, and means for signalling when the optical reproduction means is in a position corresponding to the selected gearbox ratio.

The invention is explained in more detail in the following text with the aid of an illustrative embodiment shown in the drawings.

DETAILED DESCRIPTION OF THE PREFERRED EMBODIMENT

Figure 1:
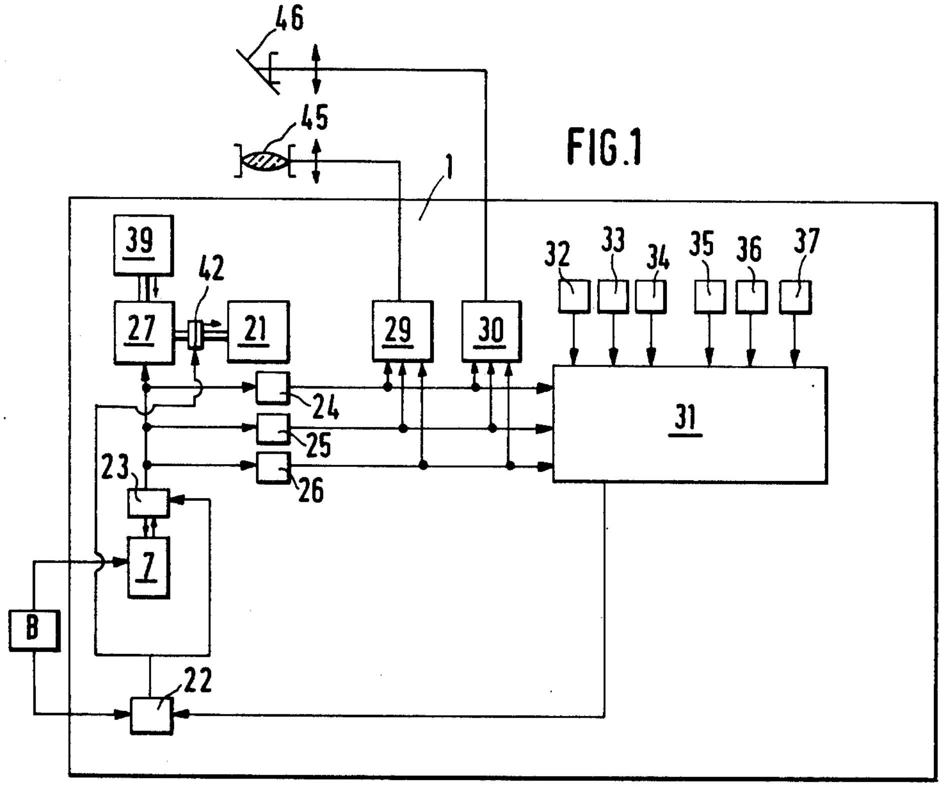
FIG. 1 shows a schematic block circuit diagram of the switching system.

In the switching system 1 represented in FIG. 1 a gear-shift lever 7 of a multi-stage gearbox 27 is shifted by an operator B into one of several positions I to III. On its output side the multi-stage gearbox 27 reduces the driving speed, delivered by the main drive 39, by means of appropriate mechanical step-down gearing. The speed reduction on the output side is effected by selection of the particular reduction factor, for example, for the rotational speed of an original-copy drum 21 which is driven via a clutch 42. Electromechanical switching elements 24, 25 and 26 are provided for setting these reduction factors, which elements come into operation according to the selected position I, II or III of the gear-shift lever (see FIG. 3). Position I of the gear-shift lever 7 can, for example, correspond to a reduction factor 1, that is to say a reproduction scale $\beta' = -1:1$, position II a factor of 0.7 which represents a reproduction scale of $1:\sqrt{2}$, and position III a reduction factor of 0.5 equivalent to a reproduction scale of 1:2. Of course other reproduction scales and more than three different reproduction scales can also be provided.

The reduction of the rotational speed of the original-copy drum 21 alone provides no exact projection of the original carried on the surface of the drum, via the optical system comprising an objective 45 and a mirror 46, onto a photoconductive layer, not shown. It is also necessary to displace this optical system to the position corresponding to the selected reduction factor, by varying the distance of the objective 45 and of the mirror 46 from the drum surface.

Each of the switching elements 24, 25 and 26 is connected to a geared servomotor 29 for displacing the objective 45, which is schematically shown, and to a further geared servomotor 30 for displacing the mirror 46, which is also schematically shown. If, for example, the switching element 24 is actuated, corresponding to position I of the gear-shift lever 7, the geared servomotors 29, 30 are started, and these displace the objective 45 and the mirror 46 until these reach the positions appropriate to position I of the gear-shift lever 7, which correspond to a reproduction scale of 1:1. The same applies analogously then on switching from position I into positions II, or III, in which case the relevant switching elements 25 or 26 trigger the geared servomotors 29, 30 and keep these in operation until the objective 45 and the mirror 46 have reached the positions corresponding to position II or position III, respectively.

The switching elements 24, 25, 26 are connected to an evaluator 31 which communicates with position monitors 32, 33, 34 corresponding to the positions I to III for the travel of the objective, and with further position monitors 35, 36, 37 for the mirror. The evaluator 31 serves to monitor the displacement, and the position monitors can be, for example, proximity switches which only give clearance for the operating sequence of the copying machine or drawing-duplication machine when the objective 45 and the mirror 46 have travelled to their correct working position. In place of one mirror two or three mirrors can also be provided, which are then driven simultaneously by the geared servomotor 30.

The proximity switches cooperate with switch lugs which are located on the objective, respectively on the mirror, in a manner that the lugs pass through the slits of the corresponding proximity switches, which are positioned in the track of travel of the objective, respectively of the mirror. In this way the magnetic fields within the slit of the proximity switch is changed and a switch signal is produced.

Immediately when the objective 45 and the mirror 46, or mirrors, have reached their correct working positions a feed-back signal is given via the evaluator 31 which indicates that the start button 22 can be pressed. The operation of the start button 22 then on the one hand actuates the locking device 23 and on the other hand engages the clutch 42, so that the original-copy drum 21 is driven.

The locking device 23 keeps the multi-stage gearbox 27 locked until the end of the program or until a stop button on the machine is operated.

Figure 2:
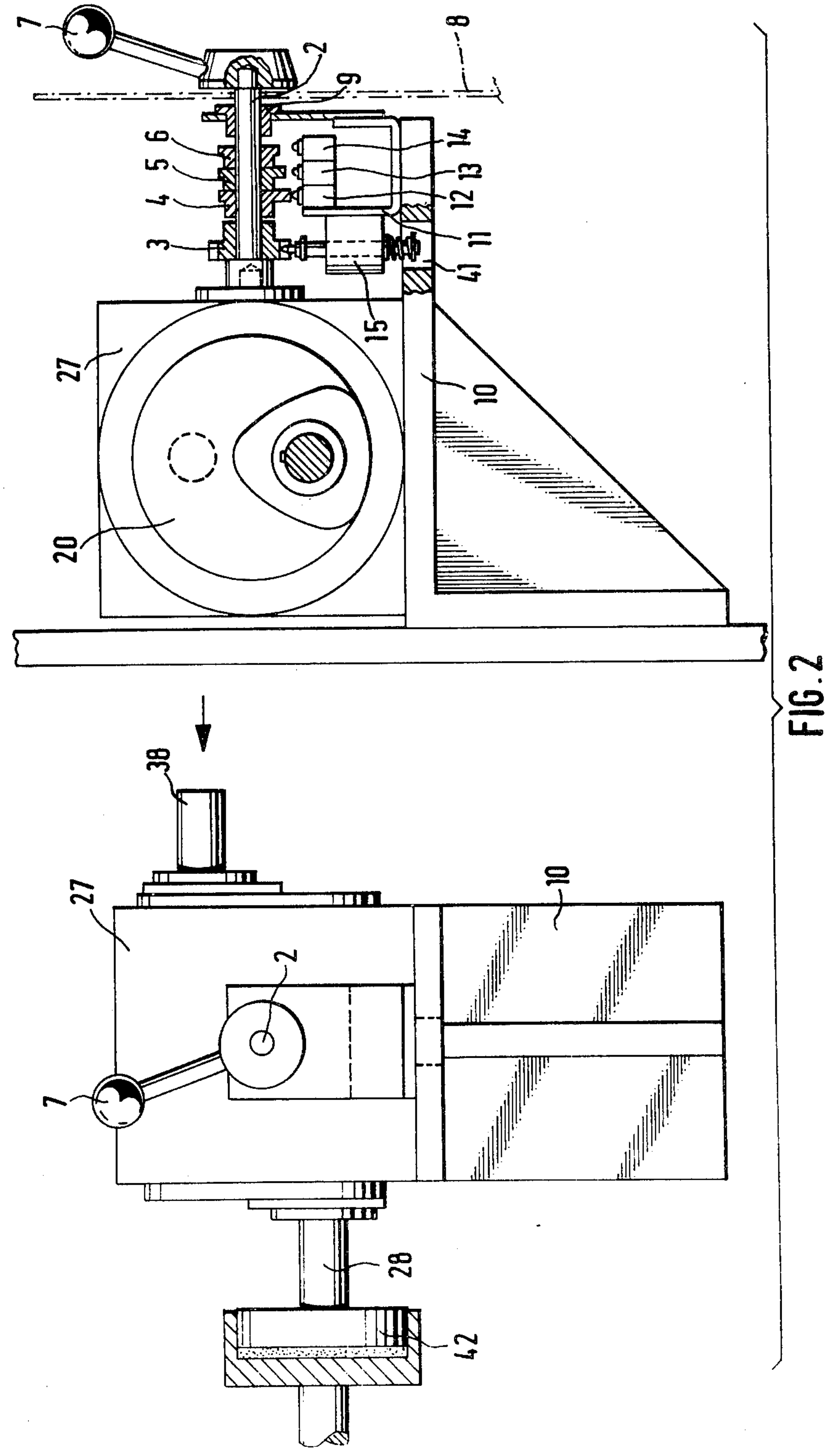
FIG. 2 shows a front view and a side view, partially sectioned, of a multi-stage gearbox of the switching system according to FIG. 1.

As shown in FIG. 2, the electromechanical switching elements 24, 25, 26 consist of trip cams 4, 5, 6 and associated microswitches 12, 13, 14. The trip cams 4, 5, 6 are located behind one another on an extended gear-shift shaft 2 of the multi-stage gearbox 27, as viewed from the gear unit 20. Between the gear unit 20 and the first trip cam 4 a locking ring 3 of the locking device 23 is located. The micro-switches 12, 13, 14 are arranged on a support plate 11 at a distance from the trip cams 4, 5, 6 and are actuated according to the selected position I to III of the gear-shift lever 7. The trip cams can be adjusted on the gear-shift shaft 2 and after adjustment are fixed rigidly to the gear-shift shaft 2. The gear-shift lever 7, which is manually operated, is located outside of a machine housing 8, shown in broken lines. Behind the machine housing a support bearing 9 is located, and this is either supported directly on the gear unit 20 by means of a connecting construction, or, as shown, fixed to a shared bracket 10 which carries the multi-stage gearbox 27. On the support plate 11 which rests on the bracket 10, an electromagnet 15, located below the locking ring 3, is fixed, in addition to the micro-switches 12, 13, 14.

Figure 3A:
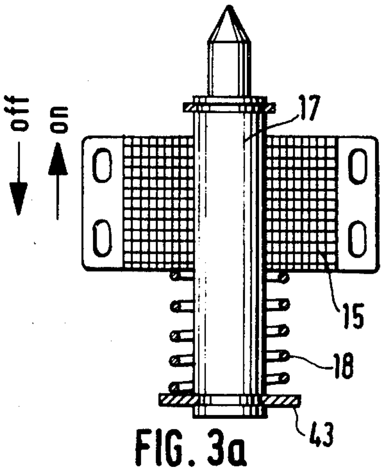
FIGS. 3*a* and 3*b* show details of a locking device for the multi-stage gearbox.
Figure 3B:
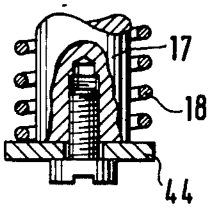
Figure 3:
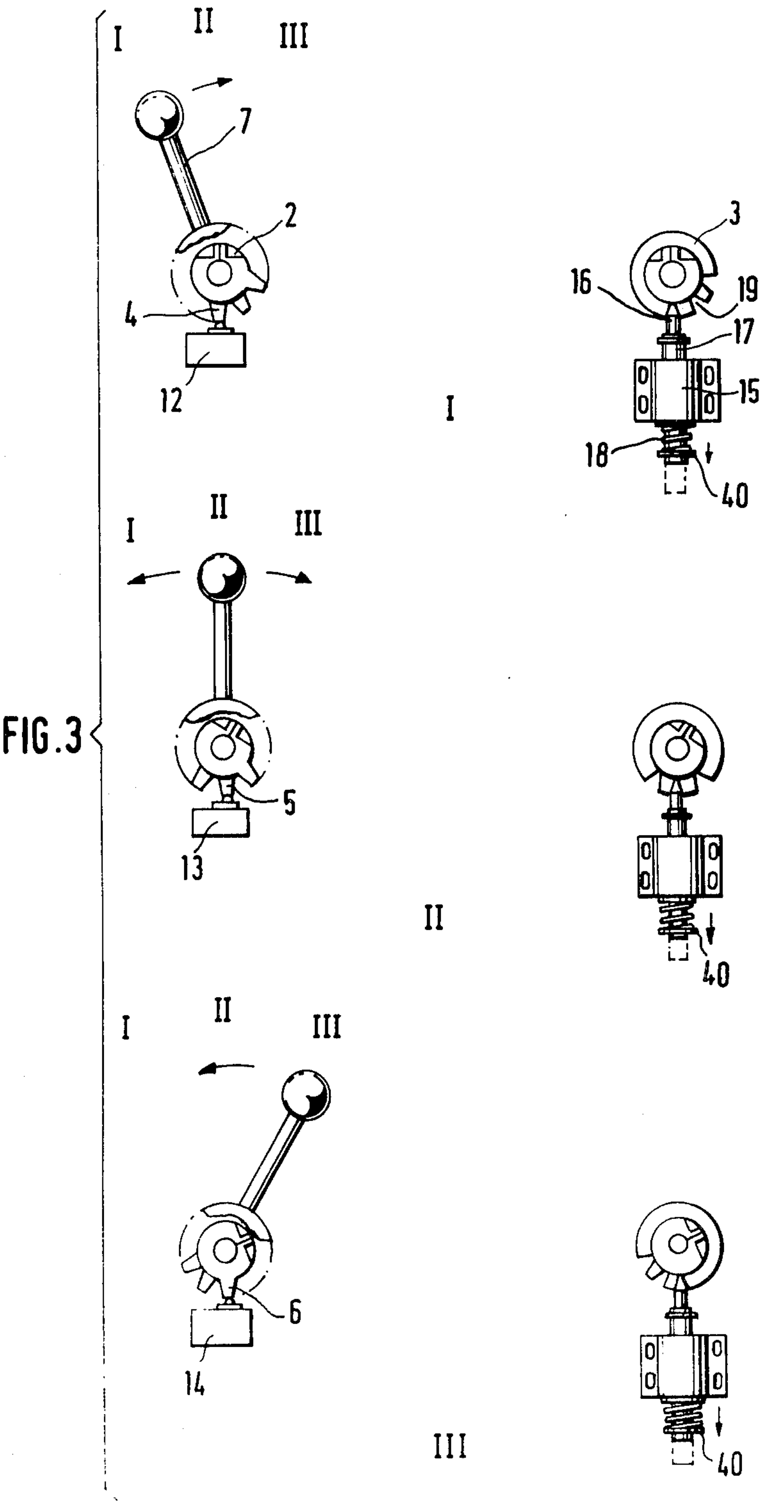
FIG. 3 shows schematically, in section, three positions of the gear-shift lever of the multi-stage gearbox according to FIG. 2, as well as the locking of the gear-shift shaft of the multi-stage gearbox in the particularly selected position of the gear-shift lever.

As can be seen from FIGS. 2 and 3 the locking device 23 comprises the locking ring 3, mounted in a fixed position on the gear-shift shaft 2 of the gearbox, and the electromagnet 15 fixed on the support plate 11. The electromagnet 15 has a locking pin 16 which is attached to the point of a magnet armature 17. The lower section of the magnet armature 17 is surrounded by a compression spring 18 which, for example, has one end biased against the electromagnet 15 and the other end against a collar 40 of the magnet armature 17 (FIG. 3). As an alternative to collar 40, the magnet armature 17 may have a circumferential incision at its lower end, in which a retaining washer 43 engages and supports the compression spring 18 (FIG. 3*a*). A further possibility consists in that a disc 44 is screwed on at the lower end of the magnet armature 17 centrically with the magnet armature and supports the end of the compression spring 18 (FIG. 3*b*). When current flows through the coil of electromagnet 15 the compression spring 18 is compressed and the locking pin 16 is engaged in the locking ring 3, while when there is no current flowing through the coil of electromagnet 15 the compression spring 18 is relaxed and pulls the magnet armature 17 out of the locking ring 3. As can be seen from FIG. 2 the lower end of the magnet armature 17 projects into an opening 41 in the bracket 10.

In FIG. 3 the positions I to III of the gear-shift lever 7 together with the corresponding positions of the locking device 23 are shown. In position I, which corresponds, for example, to the reproduction scale $\beta' = -1:1$ for a reduction factor of 1, the micro-switch 12 is actuated by the trip cam 4. When the copying machine is started, the locking pin 16 at the tip of the magnet armature 17 is pressed into the corresponding engagement notch 19 of the locking ring 3, corresponding to position I, because of the current flowing through the coil of electromagnet 15. On completion of the copying machine program the current through the electromagnet 15 is cut off and the compression spring 18 pulls the magnet armature 17 out of the engagement notch 19 of the locking ring 3. Thereafter a new switching operation can be initiated.

In position II of the gear-shift lever 7, corresponding to the reduction factor 0.7, the trip cam 5 acts on the micro-switch 13, and the locking pin 16 engages in the middle engagement notch 19 of locking ring 3, belonging to position II.

In position III of the gear-shift lever 7, corresponding to the reduction factor 0.5, the trip cam 6 operates on the micro-switch 14, and the magnet armature 17 slides the locking pin 16 into the rear engagement notch 19 of the locking ring 3 corresponding to the position III.

On switching over from one position into another position of the multi-stage gearbox the geared servomotors 29, 30 are switched on simultaneously by the cam-operated micro-switches, servomotors 29, 30 displacing the objective and the mirror or mirrors into the associated positions in accordance with the switching step of the gearbox.

By means of the start button 22 the gear-shift shaft 2 is at the same time locked by the electromagnet 15 until the program is completed or a stop button on the machine is operated. By means of the locking device the occurrence of incorrect operation of the copying machine during its operation cycle is prevented.

Figure 4:
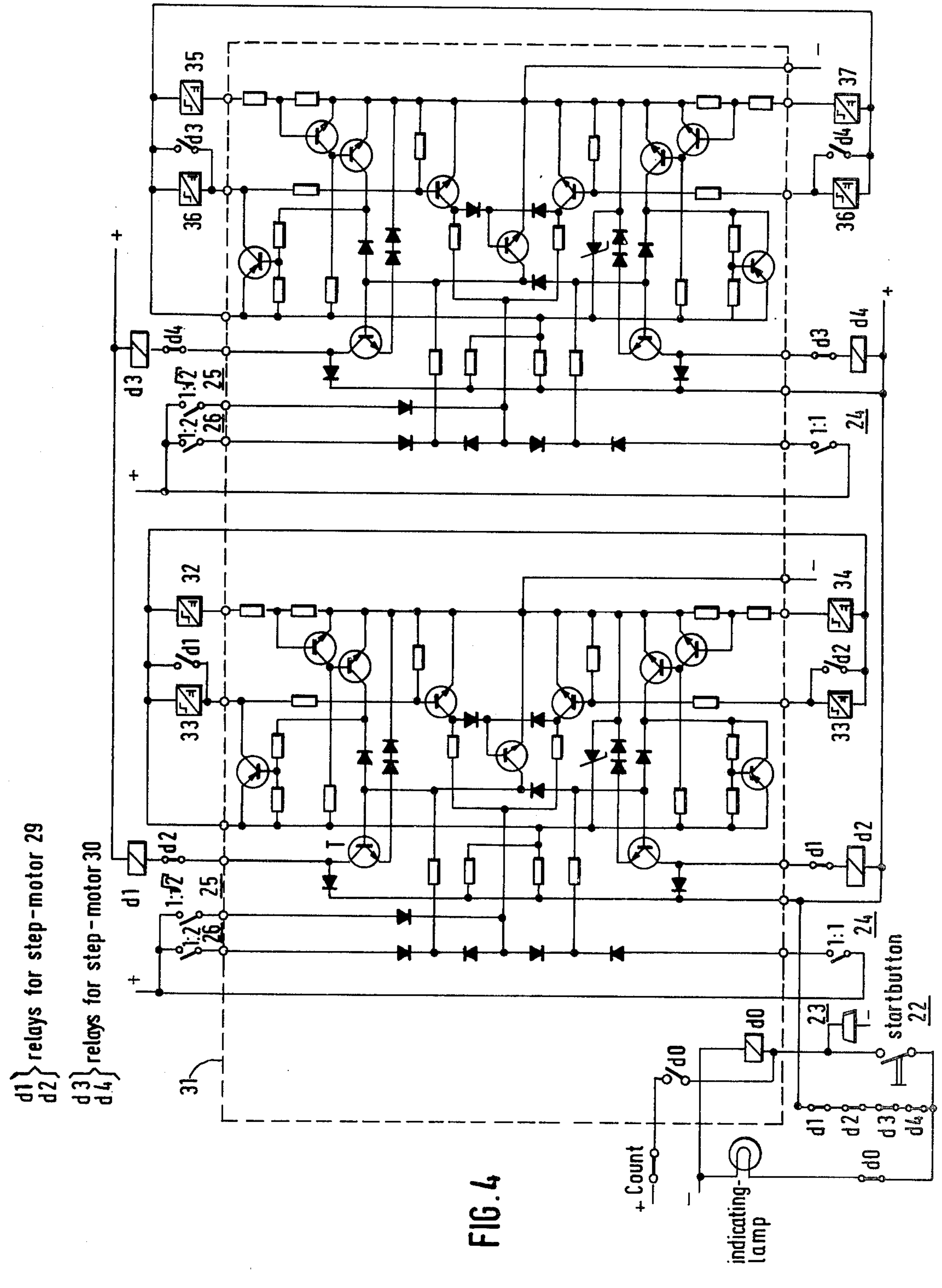
FIG. 4 shows details of an evaluator used in the switching system according to FIG. 1.

FIG. 4 shows a detailed circuit diagram of the evaluator 31, which consists of two similar circuits for the control of the movement of the geared servomotors 29, 30. The servomotors are running in the selected directions via the relays $d_1$, $d_2$, $d_3$, $d_4$ which are actuated by the electromechanical switching elements 24, 25, 26. When the servomotors 29, 30 have reached their selected positions they are stopped by the proximity switches 32, 33, 34, or 35, 36, 37, respectively, which send impulses to deenergize relays $d_2$, $d_3$ so that the power supply to the servomotors 29, 30 is interrupted.

The relay contacts $d_1$, $d_2$, $d_3$, $d_4$ are in their closed positions in the current path of an indicating lamp, when there is selected position I of the gear-shift lever 7, e.g. the switching element 24 is actuated. Then the lamp lights up and indicates that the start-button 22 can be pressed.

The relays are shown in FIG. 4 in their rest-position that is with normally closed contacts. The switch over from position I to position III, for example, by actuating of the switching element 26 connects through the relay $d_1$ via the deenergized relay $d_2$ and the servomotor 29 is running. When the servomotor 29 or the objective 45, respectively, has reached its correct working position, a signal is given from the proximity switch 32 onto the basis of transistor T, which is blocked, so that the relay contact $d_1$ is deenergized in the path of the indicating lamp.

There are provided two proximity switches 33 or 36, respectively, one of which is actuated when the lever 7 is switched over from position I to position II, the other is actuated when the lever 7 is switched over from position III to position II.

The transistor circuits of the evaluator 31 control the sequence in which the proximity switches 32, 33, 34 or 35, 36, 37, respectively, send impulse signals when the switch lugs set in the slits of the proximity switches.

What is claimed is:

1. An electromechanical switching system comprising:

a multi-stage gearbox for changing the rotational speed of a drum connected to driving means, said gearbox having a plurality of manually selectable gear ratios;

a lever coupled to said gearbox, which lever is movable into a plurality of different positions for selecting said gear ratios and is coupled to said electromechanical switching system;

means for indicating the gear ratio selected, said indicating means comprising a series of electromechanical switching elements which produce control signals;

means responsive to said gear ratio indicating means for automatically locating at least one component such as optical reproduction means, as, for example, an objective, mirror and the like, said component connected to said switching system in the position corresponding to the selected gear ratio, said locating means comprising motor means connected to said component for positioning said component in response to said control signals; and means for locking said gearbox in the selected one of said gear ratios.

2. The apparatus of claim 1, further including means for monitoring the position of at least a portion of said optical reproduction means, means responsive to said gearbox indicating means and said monitoring means for signalling when said optical reproduction means is in a position corresponding to the selected gearbox ratio.

3. The apparatus of claim 1 wherein said motor means comprises a pair of servomotors.

4. The apparatus of claim 1 wherein said gearbox includes a shift lever shaft on which said lever seats which is a manually operable gear shift lever, the rotational position of said shaft being determinative of the selected gear ratio; said electromechanical switching elements comprising a trip cam mounted in a fixed position on said shaft for each gear ratio to be selected, and a micro-switch associated with each trip cam, one of said micro-switches being tripped by the associated trip cam for each gear ratio selected.

5. The apparatus of claim 4 wherein said trip cams are adjustable on said shaft.

6. The apparatus of claim 1 wherein said gearbox includes said lever which is a manually operable gear shift lever and a shift lever shaft, the rotational position of said shaft being determinative of the selected gear ratio; said locking device comprising a locking ring fixedly mounted on said shaft, an electromagnet coil positioned adjacent said locking ring, an armature within said coil having a locking pin for engaging said locking ring upon energization of said coil, and means for resiliently biasing said locking pin away from engagement with said locking ring when said coil is deenergized.

7. The apparatus of claim 6, further comprising a collar mounted on said armature, said biasing means comprising a compression spring circumscribing said armature, and having one end biased against said coil and the other end biased against said collar, said spring being compressed upon energization of said coil.

8. The apparatus of claim 6 wherein said locking ring has a plurality of notches for engagement with said locking pin, each said notch corresponding to a gear ratio of said gearbox.

* * * * *